US006367138B1

(12) United States Patent

Newton et al.

(10) Patent No.: US 6,367,138 B1

(45) Date of Patent: Apr. 9, 2002

(54) POWER INSTALLATION TOOL FOR HELICAL COIL INSERTS

(75) Inventors: David W. Newton, Bethel; William Giannakakos, Danbury; William J. Lutkus, Watertown; Michael Bardelli, New Milford, all of CT (US)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/638,345

(22) Filed: Aug. 15, 2000

Related U.S. Application Data

(60) Provisional application No. 60/154,163, filed on Sep. 15, 1999.

(51) Int. Cl.[7] .................................................. B23P 19/04

(52) U.S. Cl. ...................................................... 29/240.5

(58) Field of Search ................................ 29/240.5, 227; 81/440–445, 450

(56) References Cited

U.S. PATENT DOCUMENTS

| | | | | |
|---|---|---|---|---|
| 2,390,545 | A | | 12/1945 | Lang |
| 2,586,805 | A | | 2/1952 | Forster |
| 2,594,901 | A | | 4/1952 | Forster |
| 3,111,751 | A | | 11/1963 | Eddy |
| 4,172,314 | A | | 10/1979 | Berecz et al. |
| 4,553,302 | A | | 11/1985 | Cosenza et al. |
| 4,553,303 | A | | 11/1985 | Yamamoto |
| 4,645,398 | A | | 2/1987 | Cosenza et al. |
| 4,980,959 | A | | 1/1991 | Czarnowski |
| 5,212,865 | A | * | 5/1993 | Davis et al. ............... 29/240.5 |
| 5,214,831 | A | | 6/1993 | Collins, Jr. et al. |
| 5,309,617 | A | | 5/1994 | Dannar |
| 5,456,145 | A | | 10/1995 | Cosenza |

* cited by examiner

*Primary Examiner*—Robert C. Watson

(74) *Attorney, Agent, or Firm*—Harness, Dickey & Pierce, P.L.C.

(57) ABSTRACT

A tool for installing a helical coil insert in a tapped hole formed in a workpiece includes a tubular body having a bore extending along its axis, a mandrel coaxially disposed in the bore of the tubular body, a punch coaxially disposed in a bore of the mandrel, a motor for rotating the mandrel, and an air cylinder for applying an axial force to the punch. The tubular body includes a recess at one end for carrying a helical coil insert in alignment with the bore. An opening in the tubular body allows a user access to the recess. The mandrel is movable from a position retracted from the helical coil insert, to a position engaging the helical coil insert, and to a position installing the helical coil insert a selected depth in the tapped hole of the workpiece. The punch slides axially in the bore of the mandrel to remove the tang from the helical coil insert upon installation of the helical coil insert in the tapped hole.

15 Claims, 10 Drawing Sheets

POWER INSTALLATION TOOL FOR HELICAL COIL INSERTS

This application claims benefit of Prov. No. 60/154,163 filed Sep. 15, 1999.

BACKGROUND OF THE INVENTION

The invention relates generally to tools for installing helical coil inserts into tapped holes and, more particularly, to such power installation tools having a punch for breaking off a tang of the helical coil insert.

Helical coil inserts are commonly installed into tapped holes of a workpiece so that threaded fasteners such as screws can be held more securely. These inserts are frequently used to improve the gripping of threaded fasteners made of relatively hard materials, such as various steel alloys, when installed in relatively soft parent materials, such as aluminum. Helical coil inserts typically include a diametrical tang used as a grip by a mandrel of the installation tool for screwing the helical coil insert into the tapped hole.

Helical coil inserts of this kind are usually installed by pre-winding them to reduce their diameter, and then rotatably threading them into a tapped hole. Once installed, the inserts expand from their contracted diameters and press radially outwardly against the walls defining the tapped holes, whereby the insert is securely held in place. Power tools for installing inserts are typically driven by an air motor and include a tubular body having a threaded bore extending along its axis and an opening at one end of the body for placing an insert in the bore. A mandrel is rotated by the motor within the threaded bore into engagement with the insert. Advancement of the mandrel forces the insert through a pre-winder, which reduces the insert's diameter, and from there into a tapped hole in an adjacent workpiece.

Once the insert is installed at the correct depth in the bore of the workpiece, the mandrel is reversed until it is removed from the insert. In many instances, particularly if a through-going hole is lined with an insert, the tang must be removed after installation as otherwise it would interfere with a bolt engaging the insert. To facilitate removal of the tang, a notch is conventionally provided in the wire near the point where the diametrical tang joins the adjacent coil convolution. Thus, after using a conventional power tool to install the insert, the installer uses a second tool to break the tang at the notch.

This two-tool process is time consuming and inefficient, particularly when many bores must be lined with helical coil inserts, such as in a manufacturing setting. Great efficiencies and cost savings would be realized by combining and simplifying the helical coil insert installation and tang removal process.

SUMMARY OF THE INVENTION

A single tool for installing a helical coil insert in a tapped hole formed in a workpiece and removing a tang from a leading coil convolution simplifies the helical coil insert installation process. The power installation tool according to the invention includes a tubular body having a bore extending along its axis. A recess preferably provided at one end of the tubular body carries a helical coil insert in alignment with the bore. An opening in the tubular body allows access to the recess for placing the insert in the recess. A mandrel is coaxially disposed in the bore of the tubular body and is movable to engage and rotate the helical coil insert for installation. More specifically, a hook on the leading end of the mandrel engages a tang on the helical coil insert for winding the helical coil insert about the leading end of the mandrel prior to installation of the coil in the tapped hole of the workpiece. Further, the mandrel includes an axial bore that mounts a punch, which is movable axially to sever the tang from the helical coil insert upon full installation of the insert in the tapped hole of the workpiece. A motor rotates the mandrel to insert the helical coil insert a predetermined distance in the tapped hole. An air cylinder applies an axial force to the punch to move it from a retracted position to an extended position where it removes the tang.

Preferably, the air motor is offset axially from the tubular body and is connected to the mandrel by a gear train, whereby rotation of the motor shaft rotates the mandrel. It is preferred to include a drive sleeve in the tubular body for connecting the gear train to the mandrel.

The punch for removing the tang from the helical coil insert may include a hammer adapted to slide axially in the bore under force of air from the air cylinder to engage and move the punch to its extended position. Alternatively, a piston in the air cylinder is connected to the punch, whereby air acting on the piston in the cylinder causes the punch to slide axially in the bore to its extended position.

DETAILED DESCRIPTION OF THE PREFERRED EMBODIMENT

Figure 1:
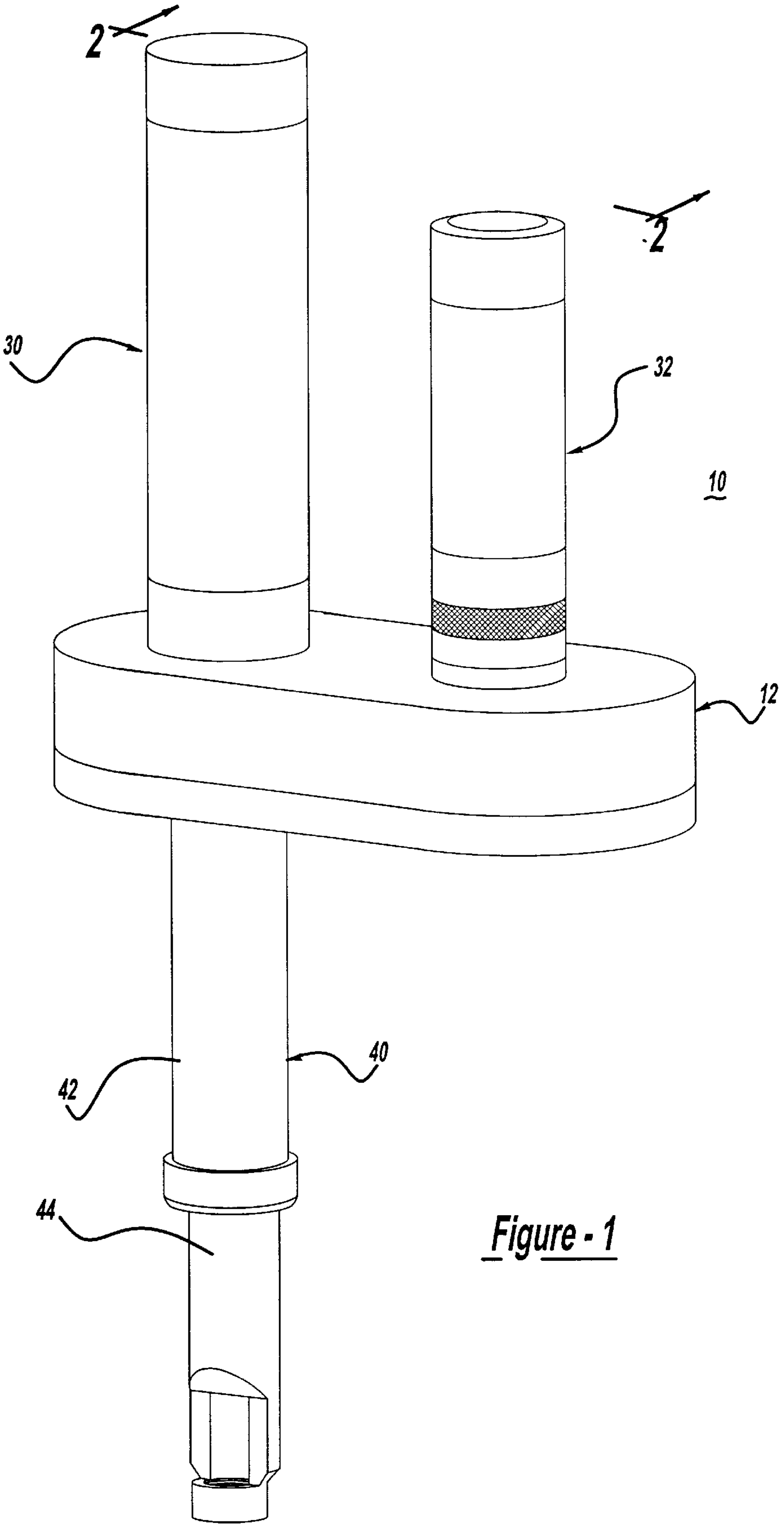
FIG. 1 is a perspective view of the power installation tool 10 according to the invention.
Figure 2:
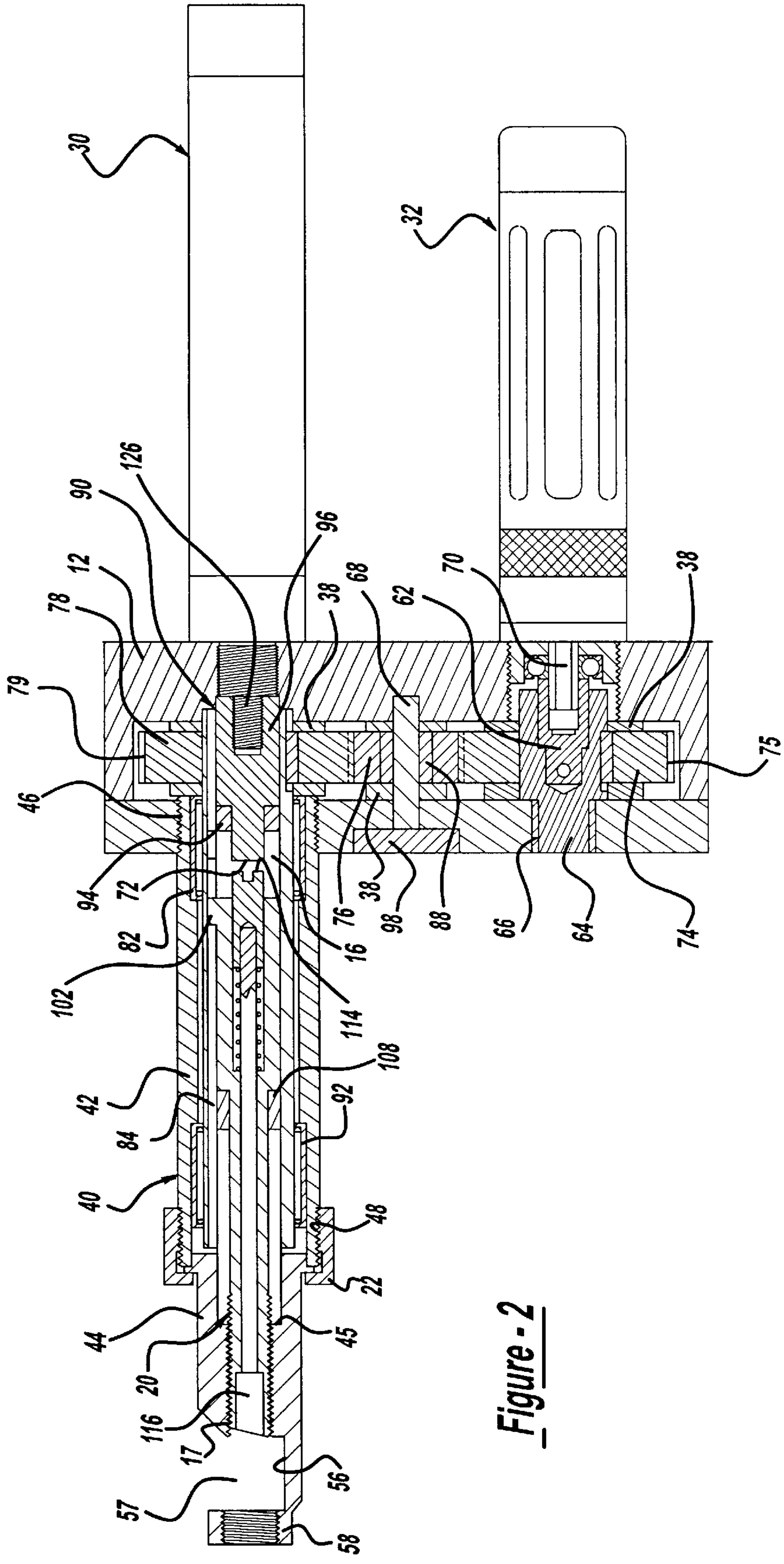
FIG. 2 is a partial sectional view of the power installation tool along line 2—2 in FIG. 1.
Figure 3:
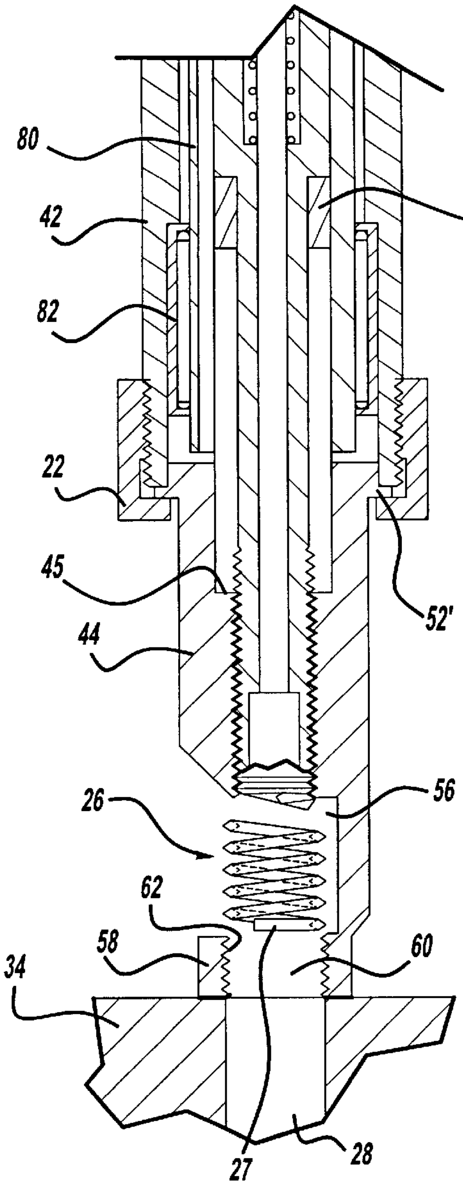
FIG. 3 is a partial sectional view of a helical coil insert carried by a recess in a bore of the power installation tool of FIGS. 1 and 2 prior to installation of the insert.

With reference to the drawings, a power installation tool 10 for installing helical coil inserts 26 having a tang 27 is shown. As shown best in FIG. 1, power installation tool 10 according to the invention generally includes a gear housing 12 mounting an air cylinder 30, an air motor 32, and an adapter body 40. With reference to FIGS. 2 and 3, a mandrel 20 for driving helical coil insert 26 into a bore 28 of a workpiece 34 is threadedly received in a bore 16 extending axially through the entire length of adapter body 40.

Adapter body 40 includes a drive housing 42 coaxially aligned with a foot 44. Bore 16 extends coaxially through both portions. Bore 16 narrows in foot 44 to form an annular shoulder 45. A cylindrical spacer 108 abuts annular shoulder 45 to limit axial travel of mandrel 20 in bore 16. Spacer 108 is removable, and can be replaced with a different-sized spacer for limiting travel of the mandrel 20 a particular distance. As shown in FIGS. 2 and 3, a first end 46 of drive housing 42 is threadedly fastened to gear housing 12. A second end 48 of drive housing 42 is secured to foot 44 via a retainer 22 that clamps a flange 52 of foot 44 to second end 48 of drive housing 42. Preferably, foot 44 includes a leading end 58 having a reduced diameter bore 60 for pre-winding a helical coil insert 26. Reduced diameter bore 60 includes threads 62 for contracting a helical coil insert 26 as it passes through bore 60. Adjacent leading end 58 of foot 44 is a recess 56 coaxial with adapter bore 16 for carrying a helical coil insert 26 to be installed. An opening 57 in foot 44 provides access to recess 56 for placing helical coil insert 26 in said recess 56.

Figure 4:
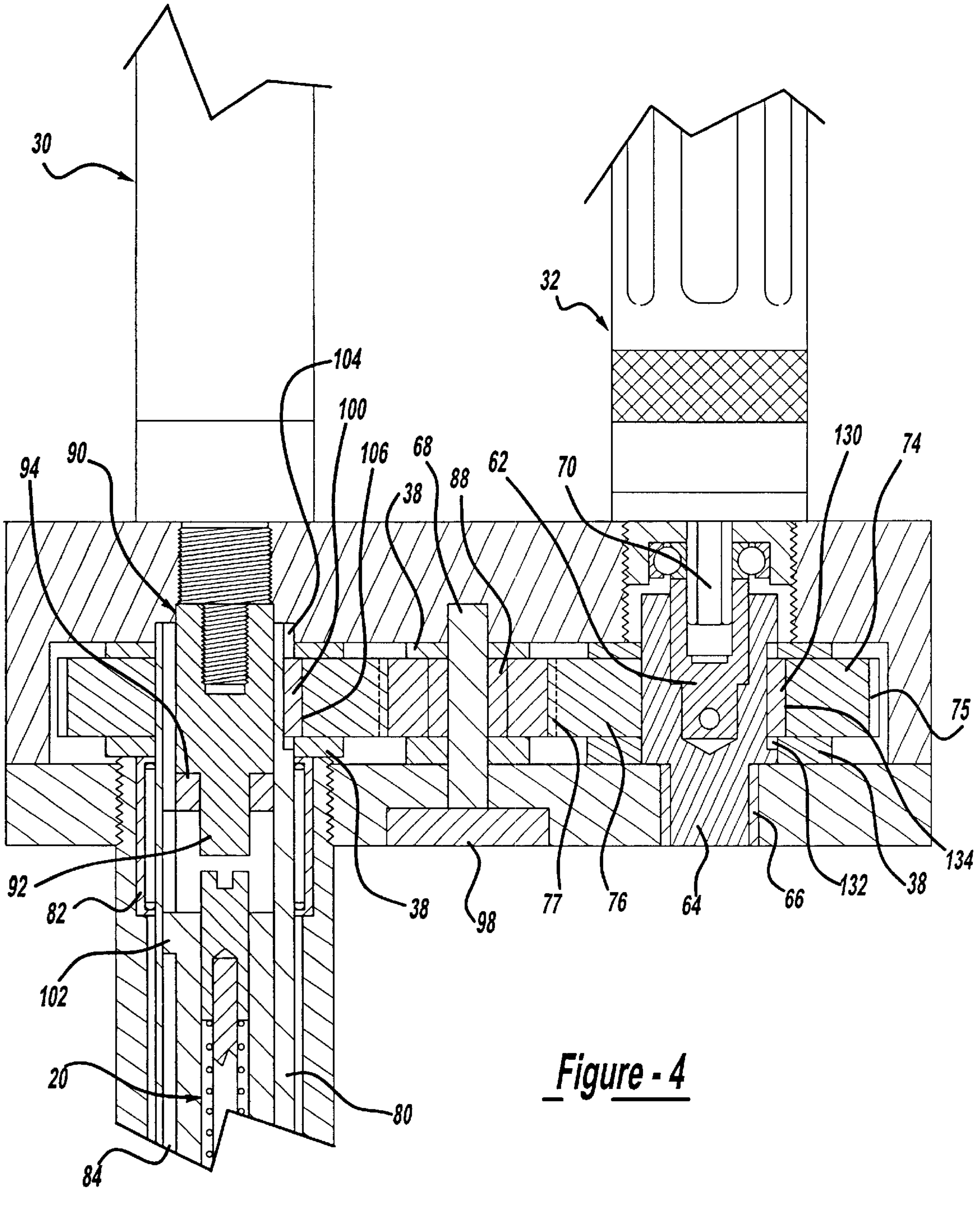
FIG. 4 is a partial sectional view of a gear train for driving a mandrel by a motor of the power installation tool of FIGS. 1 and 2.

Mandrel 20 is rotated within adapter body 40 by air motor 32 through a motor shaft 70 and a gear train as best shown in FIG. 4. Because air motor 32 is offset relative to axial bore 16 of adapter body 40, the gear train interconnects shaft 70 and mandrel 20. The gear train includes a drive gear 74 rotated directly by shaft 70 of motor 32 and supported by a bushing 66. More specifically, shaft 70 rotates spline 62 and spline adaptor 64, which coaxially mount drive gear 74. Spline adapter 64 includes an axially extending portion journalled in bushing 66 and a slot 132 aligned with a slot 134 on an inner diameter surface of gear 74. A key 130 disposed in the aligned slots 132, 134 fix drive gear 74 for rotation with spline adapter 64, and thus with motor shaft 70. Drive gear 74 includes teeth 75 to drive teeth 77 of an intermediate gear 76, which is supported via a fixed axle 68. A bushing 88 surrounds fixed axle 68, which is preferably press fit in gear housing 12 and then secured by cover 98, and permits gear 76 to freely rotate about axle 68 while its gear teeth 77 mesh with teeth 75 of drive gear 74 and teeth 79 of drive sleeve gear 78, thereby transferring rotation from drive gear 74 to drive sleeve gear 78. More specifically, gear 78 drives a drive sleeve 80, which extends the length of drive housing 42 of adaptor 40. An inner diameter surface of gear 78 is fixed to rotate with drive sleeve 80 through a key 100 registering aligned slots 104, 106 of drive sleeve 80 and gear 78, respectively. Finally, gear washers 38 disposed coaxially on opposite sides of each gear 74, 76, 78 center the gear train in the gear housing 12 and ensure proper meshing of the gears 74, 76, 78.

With reference to FIGS. 2–4, drive sleeve 80 is coaxially mounted for rotation within drive housing 42 and extends nearly the length thereof. At each end of drive sleeve 80, at an outer portion thereof, a needle bearing 82 spaces drive sleeve 80 from drive housing 42 and allows relative rotation thereof. Thus, when gear 78 rotates due to actuation of air motor 32, drive sleeve 80 similarly rotates within drive housing 42. Drive sleeve 80 also includes a longitudinal slot 84 formed along an interior surface for reception of a spline 102 of mandrel 20, as shown best in FIGS. 4 and 5. In this way, rotation of drive sleeve 80 causes rotation of mandrel 20. Further, slot 84 permits mandrel 20 to slide axially within drive sleeve 80 while rotating as mandrel 20 moves relative to adapter body 40 for installation of helical coil insert 26.

Figure 6:
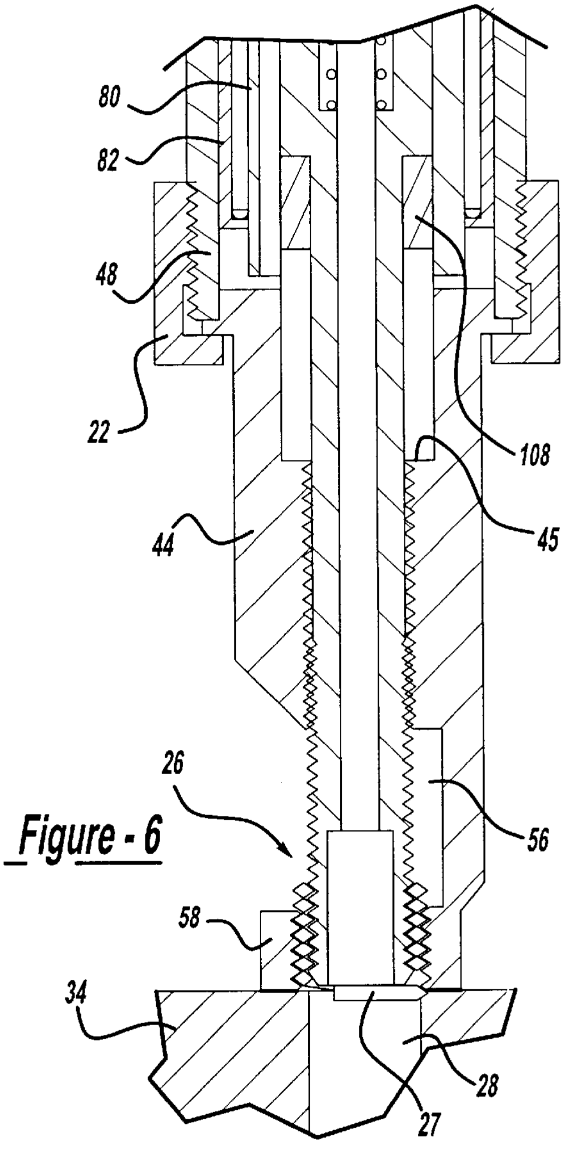
FIG. 6 is a partial sectional view of the mandrel of the power installation tool of FIGS. 1 and 2 pre-winding a helical coil insert prior to installation of the insert in a bore of a workpiece.
Figure 5:
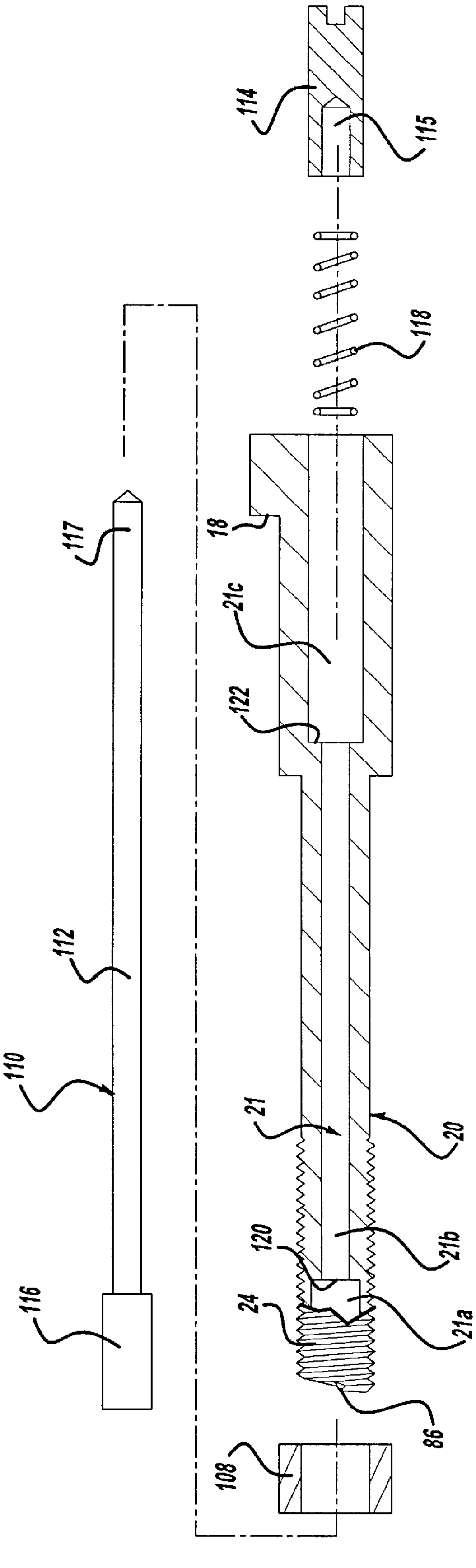
FIG. 5 is an exploded partial sectional view of the mandrel and punch of the power installation tool of FIGS. 1 and 2.

As illustrated in FIGS. 5 and 6, mandrel 20 comprises an elongated hollow body for engaging, pre-winding, and installing helical coil insert 26. Preferably, mandrel 20 has a threaded leading end 24 for engaging helical coil insert 26 and guiding mandrel 20 through bore 16, which include mated threads 17 for receiving leading end 24. Alternatively, leading end 24 of mandrel 20 can be threadless. The tip of leading end 24 includes a hook 86 for engaging tang 27 of helical coil insert 26. Further, mandrel 20 has a hollow bore 21 extending axially through its length for housing a punch 110, which is slidable axially from within mandrel 20. As shown best in FIG. 5, hollow bore 21 includes a forward bore 21*a* of larger diameter, an intermediate bore 21*b* of smaller diameter, and a rearward bore 21*c* of larger diameter. Forward and rearward bores 21*a*, 21*c* are shown to be approximately the same diameter, but can differ in diameter.

With reference to FIGS. 2 and 5, punch 110 includes an elongated body 112 supporting a punch head 114 extending outwardly from the axial bore 21 of mandrel 20 and into bore 16 of adapter body 40. Punch head 114 includes a bore 115 for press-fit reception of an end 117 of elongated body 112. At an opposite end of elongated body 112, a punch foot 116 is disposed within axial bore 21 of mandrel 20 at leading end 24 of mandrel 20. Rearward bore 21*c* of mandrel 20 houses punch head 114, which is biased by a compression spring 118 toward adapter body bore 16. Compression spring 118 is mounted coaxially about elongated body 112 of punch 110, and is compressed between end wall 122 and punch head 114. Forward bore 21*a* at leading end 24 of mandrel 20 houses punch foot 116, which is blocked against further rearward bias of spring 118 by end wall 120. Thus, punch 110 is free to move outwardly from leading end 24 of mandrel 20 against the bias of spring 118, but is blocked against further rearward motion under the force of spring 118 by end wall 120.

Figure 7:
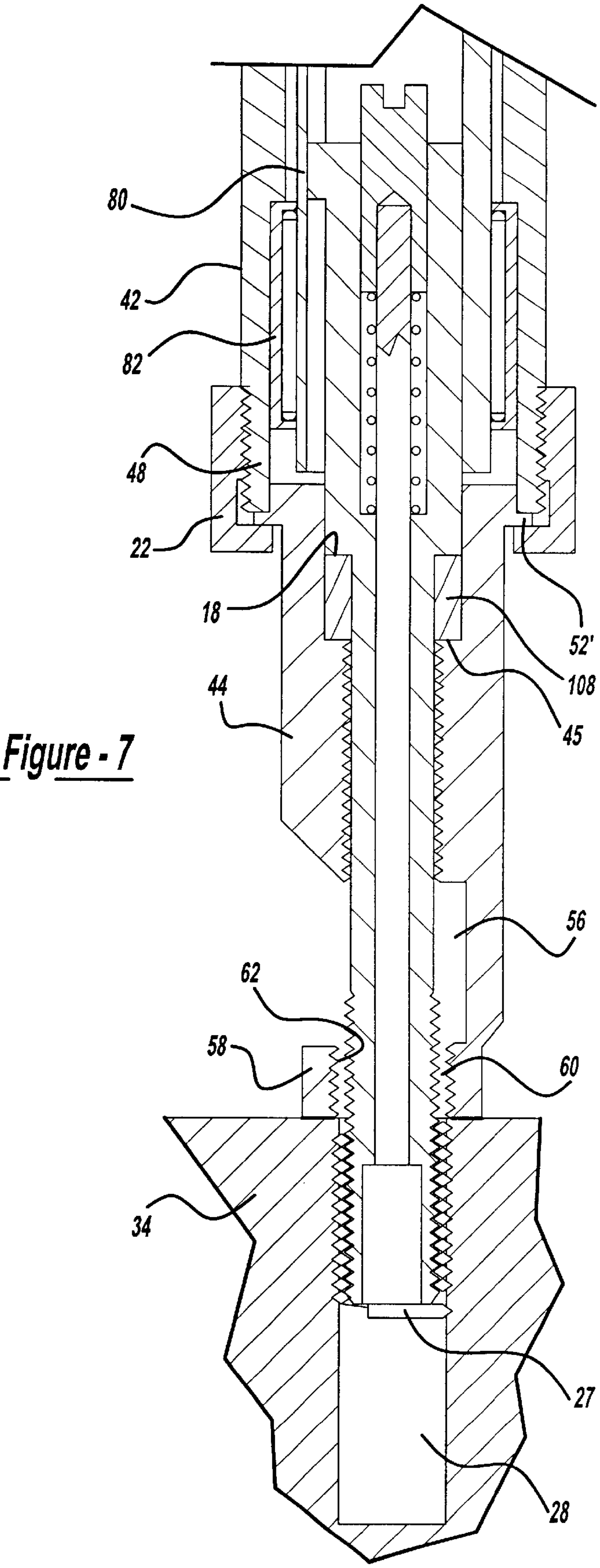
FIG. 7 is a partial sectional view of the mandrel of FIG. 6 driving the helical coil insert into the bore of the workpiece.

Mandrel 20 is rotatable in adapter body 40 until shoulder 18 of mandrel 20 forces spacer 108 against shoulder 45 of foot 44, whereby leading end 24 of mandrel 20 is blocked against further outward rotation relative adapter body 40, as shown in FIG. 7. In this manner, spacer 108 is interchangeable to define the distance leading end 24 of mandrel 20 can rotate outward from foot 44. Accordingly, retainer 22 threadedly fastens foot 44 to drive housing 42 so that spacer 108 can be readily changed to define an insert installation depth.

Figure 8:
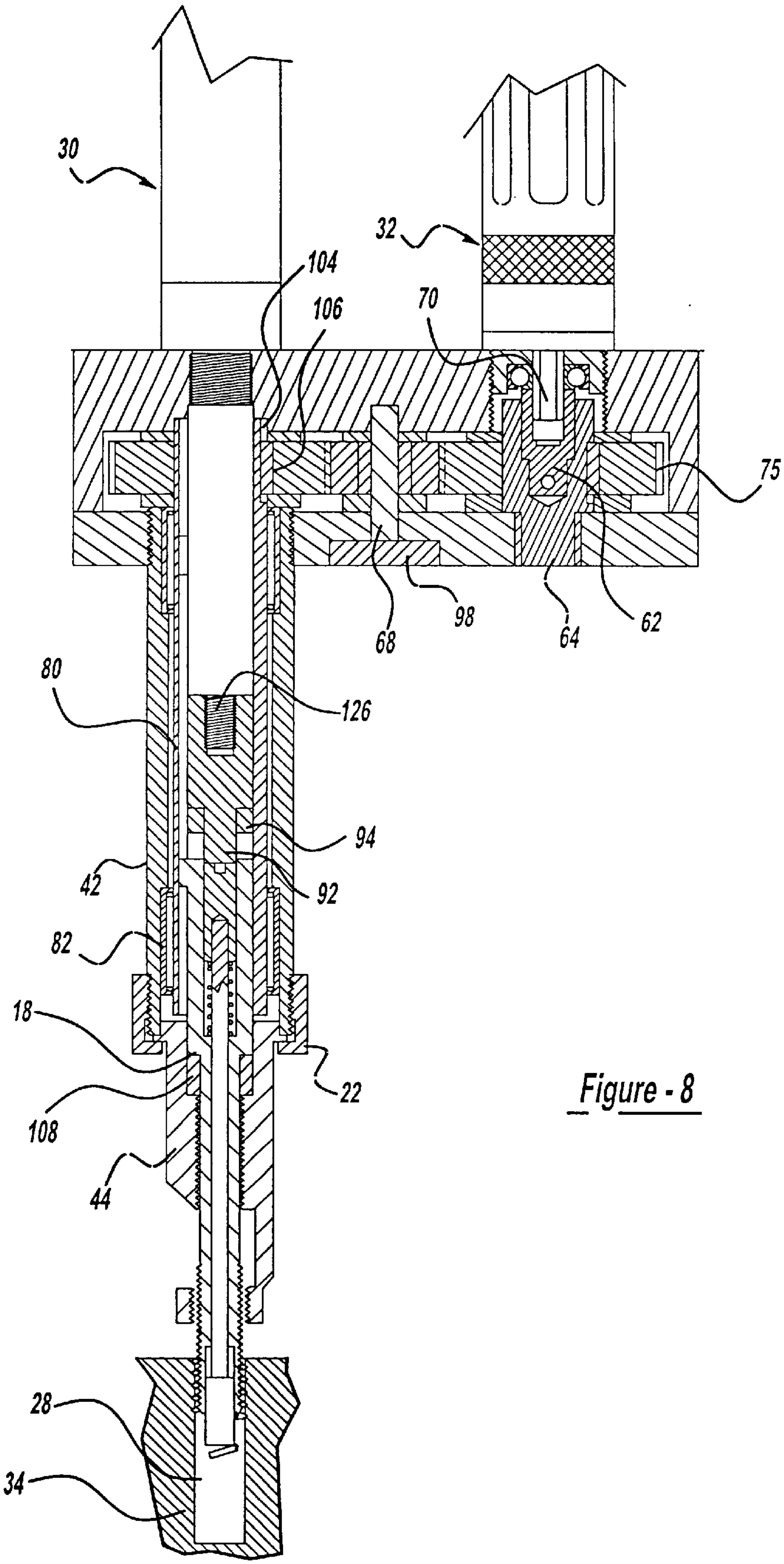
FIG. 8 is a partial sectional view of the power installation tool with the punch of FIG. 5 extended to remove a tang of the helical coil insert.

As shown in FIGS. 2 and 4, hammer 90 is disposed within a rearward portion of bore 16 defined by drive sleeve 80 and spaced apart from punch head 114, which extends from mandrel 20 into that same rearward portion of bore 16 and toward hammer 90. Hammer 90 includes a central head 92 surrounded by a cushion 94. Head 92 has approximately the same diameter as punch head 114 of punch 110, and is shaped for striking abutment with punch head 114. Further, hammer 90 is slidable axially within bore 16 of drive sleeve 80 to engage punch 110 upon actuation of hammer 92. More specifically, hammer head 92 of hammer 90 engages punch head 114 of punch 110 to force punch foot 116 axially outwardly from leading end 24 of mandrel 20. Cushion 94 of hammer 90 dampens the striking abutment of hammer 90 to mandrel 20 as punch head 114 slides into bore 21*c* of mandrel 20 against the bias of spring 118 to force punch head 114 from bore 21*a* of mandrel 20, as shown in FIG. 8. Hammer 90 is forced to slide axially in the opening 16 of drive sleeve 80 and strike punch head 114 by force of air from air cylinder 30 through a port 126 adjacent foot 96 of hammer 90.

Figure 9:
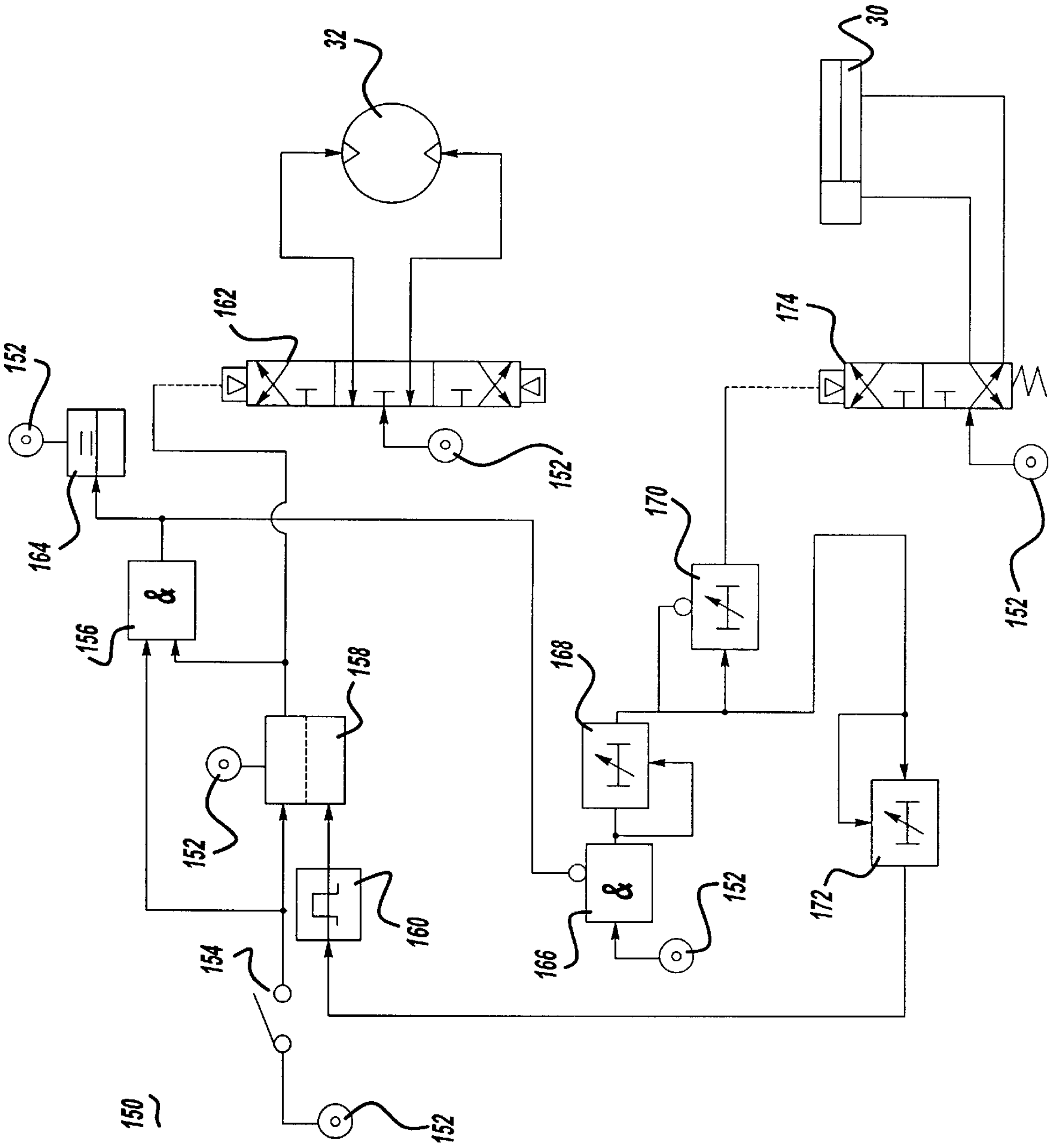
FIG. 9 is a pneumatic circuit diagram for control and operation of an air cylinder and air motor of the power installation tool of FIGS. 1 and 2.

With reference to FIG. 9, a pneumatic control circuit 150 for the installation 210 is shown. Pneumatic control circuit

150 includes main air supply 152 at several locations to supply pneumatic input to logic functions or supply main air to air motor 32 or air cylinder 30. Pneumatic control circuit 150 includes a switch 154 for selectively supplying control circuit with control air. Switch 154 may be a foot peddle or trigger switch. When closed, control air is supplied to logic control 156 and logic control 158. Each logic control 156, 158 has a pair of pneumatic inputs that both must be supplied in order for control air to be outputted from the logic control. Logic control 158 must have a main air input, as controlled by switch 154, and an input from memory control 160, which ensures the prior installation cycle has been completed. Thus, memory control 160 prevents damage to power installation 210 by not allowing a subsequent cycle if the prior cycle has not run properly. If both conditions for logic control 158 are met, pneumatic outputs are provided to valve 162 and logic control 156. Valve 162 is a three-position valve for controlling the direction of main air from main air supply 152 to air motor 32. This controls the operation of air motor 32, which, according to the three positions of valve 162, can be operated forward, reverse, or neutral. For neutral, main air from main air supply 152 is simply vented. At logic control 156, pneumatic output from logic control 158 is joined with pneumatic output controlled by switch 154. If both pneumatic outputs are present, logic control 156 is satisfied and provides a control air output to remote actuator 164, which serves as a switch for controlling main air supply to air motor 32. Thus, when logic control 156 is satisfied by completion of the prior cycle and actuation of the control switch 154, the remote actuator 164 is closed to supply main air (not shown) to air motor 32, which is operated in forward, reverse, or neutral, as determined by valve 162.

As mentioned previously, pneumatic output from logic control 156 is also supplied to logic control 166, which must have both a pneumatic output from 156 and a pneumatic output from main air 152. If both are present, logic control 166 provides pneumatic output to timer 168, which delays a pneumatic output to timer 170 and timer 172. Timer 168 delays output to timer 170 so that punch 110 is not extended by air cylinder 30 until the time delay has expired. The time delay of timer 168 is set based on the length mandrel 20 must extend to completely install a helical coil insert 26 in a workpiece 34. Upon expiration, timer 170 receives a pneumatic output and delays the expiration of that pneumatic output for a predetermined time in order to continue to extend punch 110 through helical coil insert 26 to remove tang 27. Thus, timer 170 operates to continue to supply a pneumatic output to a valve 174 for controlling air cylinder 30. Thus, by continuing to supply a pneumatic output to valve 174, timer 170 delays retraction of punch 110 within mandrel 20. Valve 174 is a two-position valve for venting or supplying main air from main air supply 152. When supplying main air to air cylinder 30, punch 110 is driven axially through mandrel 20 to sever tang 27 from helical coil insert 26. Timer 168 also supplies a pneumatic output to timer 172, which delays the end of the installation cycle for a predetermined amount of time to ensure air motor 32 continues to operate until mandrel 20 returns to its home position. After expiration of that predetermined amount of time, timer 170 provides a pneumatic output to memory control 160 to satisfy a cycle completion condition. At this point, pneumatic control circuit 150 is reset for another cycle.

In use, helical coil insert 26 is placed in recess 56, and aligned with bore 16, through opening 57 in adapter body 40. To accommodate loading of the helical coil insert 26, mandrel 20 is fully retracted, as shown in FIG. 3. The installer actuates air motor 32 to cause rotation of drive sleeve 80 through interconnection of gears 74, 76, 78 and shaft 70 of air motor 32, as explained above. Drive sleeve 80 rotates mandrel 20 through connection of mandrel spline 102 in drive sleeve slot 84. Threaded leading end 24 of mandrel 20 rotates through threaded portion 17 of bore 16 until leading end 24 engages the helical coil insert 26 in recess 56. Upon engagement, leading end 24 slides through helical coil insert 26 until hook 86 grabs tang 27 to rotate helical coil insert 26. Mandrel 20 then rotates insert 26 into reduced diameter bore 60 to pre-wind insert 26 by contracting insert 26 about leading end 24, as shown in FIG. 6. Continued advancement of mandrel 20 causes pre-wound insert 26 to pass from reduced diameter bore 60 into bore 28 in workpiece 34. Air motor 32 will continue to advance mandrel 20 until shoulder 18 of mandrel 20 contacts spacer 108, causing air motor 32 to stall, as illustrated in FIG. 7.

Upon stalling, air motor 32 automatically reverses rotation of mandrel 20, which unthreads from installed insert 26. Insert 26 expands outwardly against workpiece 34 to secure itself in bore 28. After approximately one revolution of mandrel 20, air cylinder 30 activates to release air from port 126, which acts on hammer foot 96 to force hammer 90 to slide forcefully into punch head 114 of punch 110. In turn, punch foot 116 of punch 110 slides axially outward from within bore 21*a* of leading end 24 to sever tang 27 from helical coil insert 26, as shown in FIG. 8. By force of spring 118, punch 110 then returns to its retracted position in bore 21 of mandrel 20. Mandrel 20 then continues to unthread until it returns to a home position with leading end 24 of mandrel 20 within bore 16 of foot 44. The return of the mandrel 20 to its home position also forces hammer 90 to return to a home position as punch head 114 pushes hammer head 92 until hammer foot 96 is disposed adjacent air cylinder outlet port 126.

Figure 10:
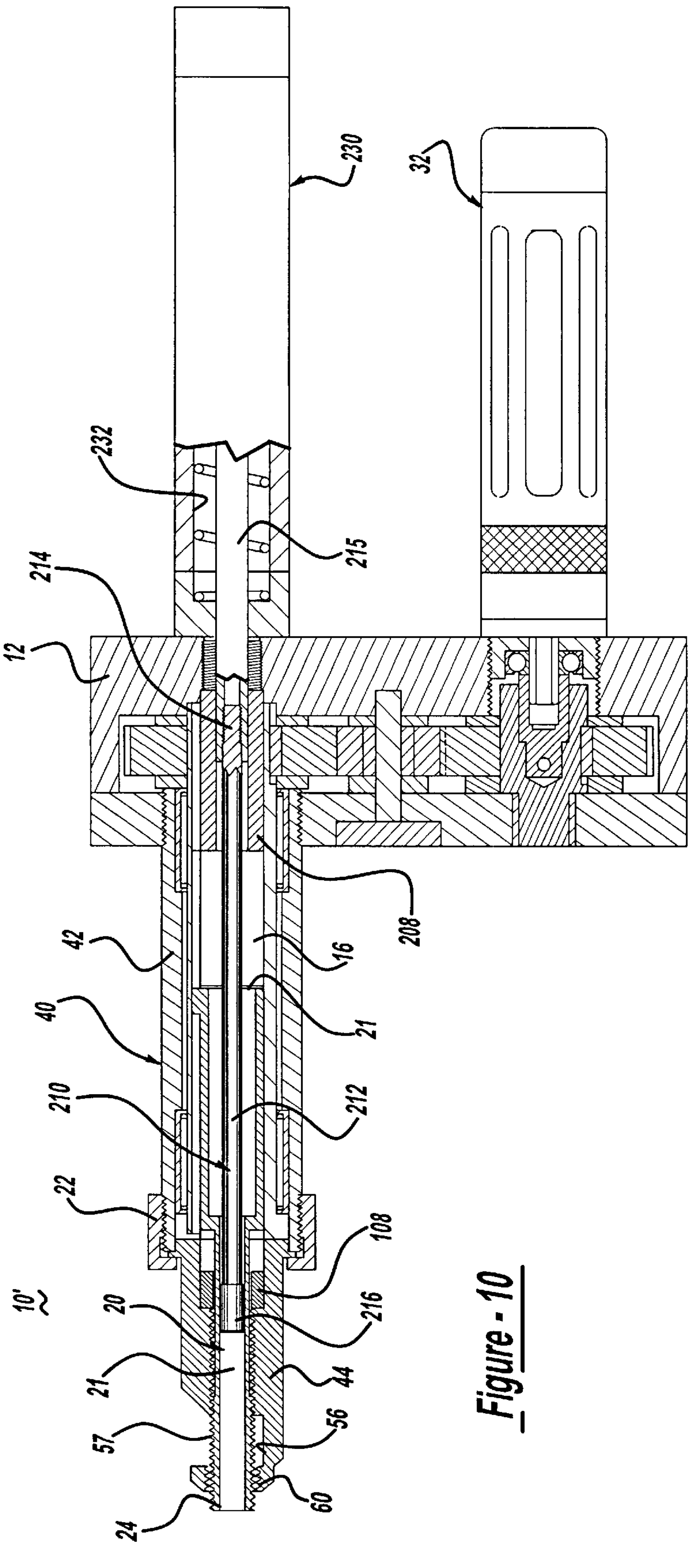
FIG. 10 is a partial sectional view of the power installation tool according to a further embodiment of the invention with the punch in a retracted position.
Figure 11:
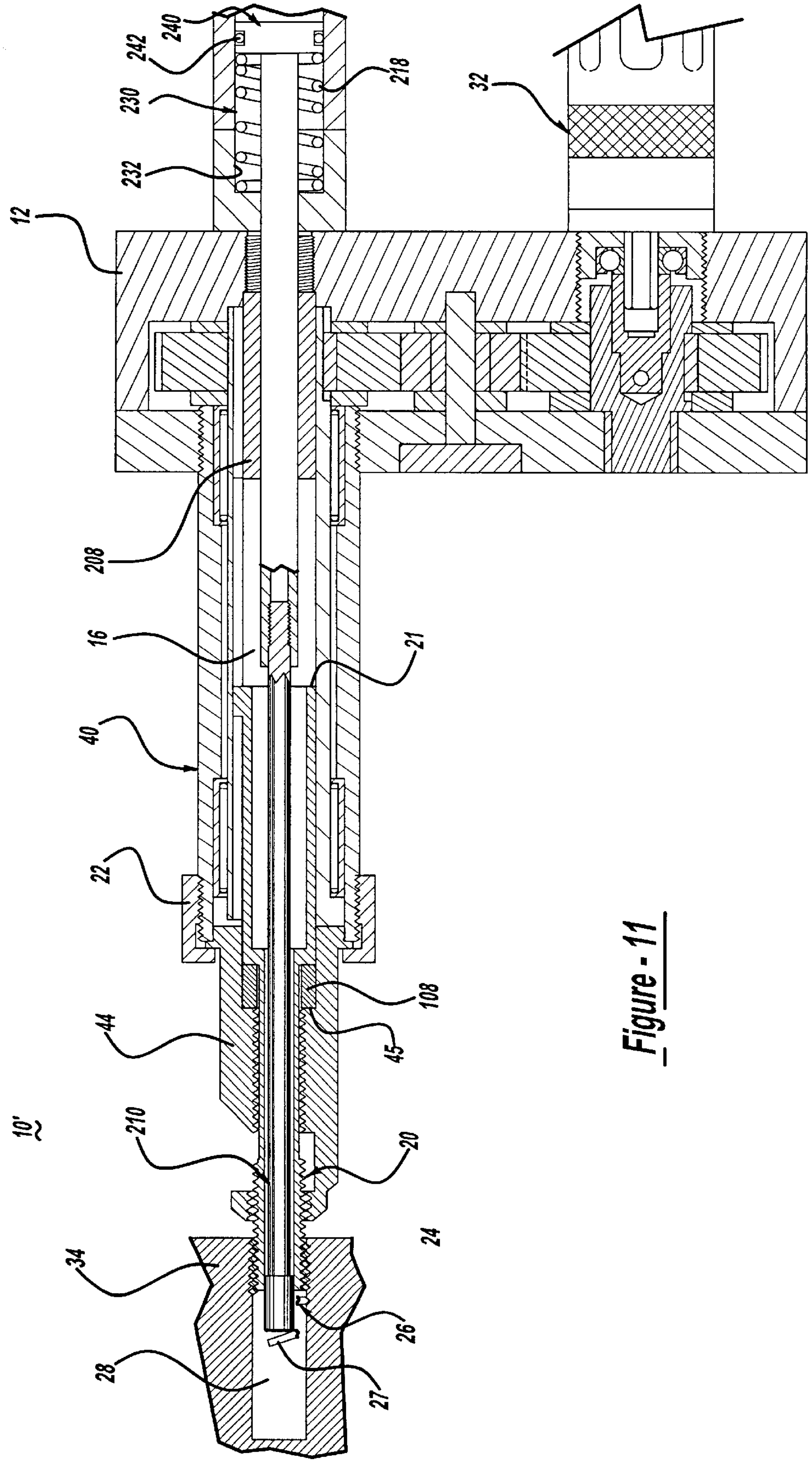
FIG. 11 is a partial sectional view of the power installation tool of FIG. 10 with the punch extended to remove a tang of the helical coil insert.

With reference to FIGS. 10 and 11, an alternative embodiment of a power installation tool 10' according to the invention is shown. The power installation tool 10' is similar to the power installation tool 10 in construction and use, with the exception of the arrangement of the punch and air cylinder. Accordingly, the power installation tool 10' includes reference numerals that are the same as those used when describing the power installation tool 10 where the previous description is generally applicable.

The mandrel 20 of power installation tool 10' has a hollow bore 21 extending axially through its length for housing a punch 210, which is slidable axially from within mandrel 20. The punch 210 is an elongated body 212 extending through bore 16 of the adapter body 40 and having a connector 214 at one end and a punch foot 216 at an opposite end. The connector 214 is preferably a threaded male connector for reception in a threaded female connector at one end of a shaft 215 extending into an air cylinder 230. The opposite end of the shaft 215 is coupled to a piston 240, which reciprocates under the force of air pressure within the air cylinder 230. The piston 240, and thus the punch 210, is biased to a retracted position by a compression spring 218 positioned coaxially about the shaft 215 between an end of the air cylinder 230 and the piston 240. Preferably, the piston 240 includes an o-ring 242 about its circumference to provide an airtight seal between the piston 240 and cylinder walls 232. The punch 210 is free to move outwardly from the leading end 24 of the mandrel 20 against the bias of the spring 218, which returns the punch 210 to its retracted position in the absence of the force of air pressure causing the piston 240 to compress the spring 218 within the air cylinder 230.

As before, mandrel 20 is rotatable in adapter body 40 until shoulder 18 in mandrel 20 forces spacer 108 against shoulder 45 of foot 44, whereby leading end 24 of mandrel 20 is blocked against further outward rotation relative adapter body 40. In this manner, spacer 108 is interchangeable to define the distance leading edge 24 of mandrel 20 can rotate outward from foot 44. Further, a spacer 208 is disposed rearwardly within bore 16 of adapter body 40 to define the limit of inward rotation of mandrel 20 relative adapter body 40. Further, like spacer 108, spacer 208 is interchangeable to define the distance mandrel 20 can rotate inward from foot 44. Thus, to accommodate both interchangeable spacers 108, 208, retainer 22 threadedly fastens foot 44 to drive housing 42 so that spacers 108, 208 can be readily changed to define an insert installation depth in mandrel 20 retraction limit.

Use of the power installation tool 10' is similar to use of the power installation tool 10, as described previously. Mandrel 20 forces a pre-wound insert 26 to pass from reduced diameter bore 60 into a bore 28 in workpiece 34. Air motor 32 continues to advance mandrel 20 until shoulder 18 of mandrel 20 contacts spacer 108, causing air motor 32 to stall, as illustrated in FIG. 11. Upon stalling, air motor 32 automatically reverses rotation of mandrel 20, which unthreads from installed insert 26. Insert 26 expands outwardly against workpiece 34 to secure itself in bore 28. After approximately one revolution of mandrel 20, air cylinder 230 activates to release air against piston 240, which forcefully slides punch 210 axially forward. Punch foot 216 of punch 210 slides axially outward from within bore 21 of leading end 24 to sever tang 27 from helical coil insert 26, as shown in FIG. 11. By force of compression spring 218, punch 210 then returns to its retracted position in bore 21 of mandrel 20. Mandrel 20 continues to unthread until it returns to a home position with rear end 21 of mandrel 20 against spacer 208 in bore 16.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A tool for installing a helical coil insert having a tang in a tapped hole formed in a workpiece, said tool comprising:

a tubular body including a bore extending along its axis;

a mandrel coaxially disposed in said bore of said tubular body and movable in said bore of said tubular body from a retracted position to an installation position extending from said tubular body for engaging and installing said helical coil insert a selected depth in said tapped hole of said workpiece, said mandrel including a leading end for drivingly engaging the tang of said helical coil insert and a bore extending along its axis;

a punch coaxially disposed in said bore of said mandrel and movable axially from a first position retracted from the leading end of said mandrel to a second position extending through the leading end of said mandrel for removing the tang from said helical coil insert;

a motor for rotating said mandrel in said tubular body from said retracted position to said installation position; and an air cylinder for applying an axial force to said punch to move it from said first position to said second position.

2. The tool according to claim 1 further comprising a pre-winder at a foot of said tubular body, said pre-winder including a reduced diameter bore for contracting said helical coil insert about a leading end of said mandrel.

3. The tool according to claim 2, wherein said reduced diameter bore of said foot is threaded.

4. The tool according to claim 1, wherein said motor is offset axially from said tubular body and further comprising a gear train interconnecting said mandrel and a shaft of said motor, whereby rotation of said motor shaft is transferred to said mandrel.

5. The tool according to claim 4, further comprising a drive sleeve interconnecting said gear train to said mandrel.

6. The tool according to claim 1, further comprising a hammer adapted to slide axially in said bore under force of air from said air cylinder, said hammer movable from a retracted position adjacent an outlet port of said air cylinder to a deployed position forcing said punch into said second position.

7. The tool according to claim 1, further comprising a piston in said air cylinder and a shaft connecting said piston to said punch, whereby axial movement of said piston in said air cylinder forces said punch from said first position to said second position.

8. The tool according to claim 1, wherein said tubular body includes a foot coaxially aligned with a drive housing, said foot removably fastened to said drive housing by a retainer.

9. The tool according to claim 1, wherein said tubular body receives a spacer aligned coaxially with said bore of said tubular body and disposed between an annular shoulder of said bore of said tubular body and an annular shoulder of said mandrel to limit axial movement of said mandrel in said bore of said tubular body.

10. A tool for installing a helical coil insert in a tapped hole formed in a workpiece, said tool comprising:

a tubular body having a bore extending along its axis and including an opening at one end for positioning a helical coil insert in alignment with said bore of said tubular body;

a mandrel coaxially disposed in said bore of said tubular body and movable from a retracted position spaced from said helical coil insert to an installation position in which said helical coil insert is installed to a selected depth in said tapped hole of said workpiece;

a punch axially slidable in a bore of said mandrel from a retracted position in which a foot of said punch is disposed within said bore of said mandrel to an extended position in which said foot extends through said helical coil insert;

a motor for rotating said mandrel from said retracted position to said installation position, said motor including a drive shaft interconnected to said mandrel through a gear train and a drive sleeve;

an air cylinder for applying an axial force to said punch to move it from said retracted position to said extended position;

a gear housing mounting said gear train, said air cylinder, said air motor, and said tubular body, said drive sleeve being driven by said gear train and extending coaxially into said tubular body from said gear housing;

whereby said motor drives said mandrel through drive sleeve and gear train to install said helical coil insert in said tapped hole formed in said workpiece and said air cylinder drives said punch to remove said tang from said helical coil insert.

11. The tool according to claim 10 further comprising a pre-winder at a foot of said tubular body, said pre-winder including a reduced diameter bore for contracting said helical coil insert about a leading end of said mandrel.

12. The tool according to claim 11, wherein said reduced diameter bore of said foot is threaded.

13. The tool according to claim 10, further comprising a hammer adapted to slide axially in said bore under force of air from said air cylinder, said hammer movable from a retracted position adjacent an outlet port of said air cylinder to a deployed position forcing said punch to said extended position.

14. The tool according to claim 10, further comprising a piston in said air cylinder and a shaft connecting said piston to said punch, whereby axial movement of said piston in said air cylinder forces said punch from said first position to said second position.

15. The tool of claim 10, wherein said tubular body receives a spacer aligned coaxially with said bore of said tubular body and disposed between an annular shoulder of said bore of said tubular body and an annular shoulder of said mandrel to limit axial movement of said mandrel in said bore of said tubular body.

* * * * *